United States Patent [19]
Greenhalgh

[11] 3,959,711
[45] May 25, 1976

[54] PULSE WIDTH MODULATED POWER SUPPLIES

[75] Inventor: Frank E. Greenhalgh, Amityville, N.Y.

[73] Assignee: Technology Development Corporation, Dayton, N.J.

[22] Filed: Dec. 9, 1974

[21] Appl. No.: 530,736

[52] U.S. Cl. ................................. 321/18
[51] Int. Cl.² .......................... H02M 1/08
[58] Field of Search ............................ 321/18, 45 R

[56] References Cited
UNITED STATES PATENTS

| | | | |
|---|---|---|---|
| 3,361,952 | 1/1968 | Bishop | 321/45 R |
| 3,423,665 | 1/1969 | Greenberg et al. | 321/45 R X |
| 3,435,324 | 3/1969 | Bishop | 321/45 R |
| 3,670,234 | 6/1972 | Joyce | 321/18 |
| 3,859,586 | 1/1975 | Wadlington | 321/18 |

Primary Examiner—William M. Shoop
Attorney, Agent, or Firm—Arthur L. Plevy

[57] ABSTRACT

A pulse width modulated power supply contains an inverter circuit which includes a plurality of transistors connected to a drive transformer. The transistors are caused to conduct alternatively to provide a switching waveform at an output, which waveform is filtered to provide a regulated DC output voltage.

The supply includes means for preventing switch-through of the transistors while providing regulation of the output voltage to keep the same constant over a wide range of operating conditions.

Other means provide an efficient drive for the inverter as well as the capability of operating the supply at either of two input voltage levels.

8 Claims, 3 Drawing Figures

PULSE WIDTH MODULATED POWER SUPPLIES

BACKGROUND OF INVENTION

This invention relates to power supplies in general, and more particularly to a power supply of the type utilizing pulse width modulation techniques to generate DC output voltages at high current levels with increased efficiency.

There are a number of power supplies which include inverters, converters and so on which operate to provide output regulated DC voltages and currents by utilizing switching techniques in lieu of conventional rectifiers and dissapative series pass regulation schemes. These designs employ a number of different circuit configurations but all operate with the common concept that the output voltage is derived from the average value of a rectangular or pulse waveform. By varying the width of this pulse and therefore the average value, one can regulate such supplies.

The advantages in using switching techniques to fabricate power supplies are realized in increased efficiency and smaller size. Efficiency is obtained due to the fact that switching techniques can maintain a constant output as the input line voltage and load changes. The transistors used in switching techniques exhibit low voltage drops when they are on or conducting and conduct very little or no current when they are switched off. With other conventional systems, the variations in line voltage and load changes must be absorbed to maintain a constant output. Thus in a supply using the conventional series pass transistor regulator which acts as a variable resistor in series with the output level, excessive dissipation can occur for varying line and load conditions.

This dissipation is eliminated using switching techniques as the transistors used to generate the constant output are switched on and off at relatively high frequencies. The output waveform produced by the switching transistors is then rectified to provide the desired DC output. The switching duty cycle of operation can be controlled to provide regulation by varying the width of the switching waveforms in accordance with line or load changes. Due to operation at frequencies well above that of the AC line (60Hz), the transformers used in such supplies are smaller and substantially lighter in weight.

In any event, while switching techniques used in power supplies are well known, they impose various burdens on the manufacturer. First, a switching type supply usually has an increased number of components as compared to conventional supplies. They further operate at higher noise levels due to the generation of RFI caused by the sharp transitions of the switching waveforms and the rate of switching in general.

As the frequency of operation becomes higher, the transistors used in developing the switching waveforms do not respond rapidly enough due to emitter to base and collector base capacities and so on, and in essence, may not operate in a switching mode but tend to conduct at the same time. This can short out the transformers which result in the loss of operation. In any event, the higher the frequency of the switching operation, the smaller the magnetic components.

The limit of high frequency with high power operation is inherent in the commercially available transistors. Therefore, a compromise must be made in regard to the switching frequency or the problem of assuring reliable operation has to be solved by the use of compensating circuitry.

The prior art was cognizant of the problem and referenced the compensating circuitry as dead-time circuits and used the same in inverter or power supply configurations.

As indicated, the problem arises where both switching power transistors are conducting or are on at the same time. The problem designated as switch through could cause power loss or switching transistor failure.

U.S. Pat. No. 3,435,324 entitled DRIVEN INVERTER DEAD-TIME CIRCUIT issued on Mar. 25, 1969 shows such a circuit which operates to bias on a transistor, which transistor serves to short out the drive signal long enough to assure all the off-going transistors are able to recover. In any event, the circuit shown is frequency dependent and uses transformer coupling and capacitors in the dead time circuit and hence is not adaptable for wide frequency operation and is relatively expensive to implement.

Other circuits as that shown in U.S. Pat. No. 3,461,405 also use dead time circuitry consisting of saturable core reactors and diodes to permit reliable turn off of the switching transistors. This technique is also expensive and frequency dependent. Other approaches as U.S. Pat. No. 3,506,908 are feedback windings to improve efficiency which techniques again are frequency dependent and unreliable.

Other patents as U.S. Pat. No. 3,629,725 use similar techniques including saturable reactors and diodes to solve the problem. Other configurations as shown in U.S. Pat. No. 3,771,040 show unbalanced circuit configurations which employ multivibrators as duty-cycle generators. The multis are unbalanced to assure that a given one of the transistors is on first, when power is applied. Such unbalancing limits the operation and creates additional problems in implementing the circuitry.

The basic concept of a particular type of switching supply sometimes referred to as a pulse width modulation (PWM) supply is to generate a DC voltage from the input source. A switching transistor is used to switch the DC on and off generating a waveform with excursions between a point of reference potential and the DC level. This waveform is then filtered to provide a DC output component from the repetitive switching waveform.

Besides the above described switch-through problem, many other factors impose certain difficulties.

For example, the input requirements for such supplies generally require the primary circuits to be capable of operating in series or parallel causing a pair or one of the switching transistors to "float" with respect to the input.

Furthermore, one must provide regulation of such power switching supplies. While switching regulators are also known and function to change the switching rate or pulse width, one must condider all of the above problems to provide an efficient and reliable power supply.

It is therefore an object of this invention to provide an improved switching regulator apparatus which apparatus is accomplished by utilizing the dead-time circuitry as a modulating or regulation means.

It is therefore another object of this invention to provide an efficient switching power supply having a dead-time circuit for eliminating switch through, which is relatively easy to fabricate and inexpensive to implement while operating relatively independent of the switching frequency as relying on frequency insensitive components. The switching power supplies include other features which assure reliable operation of such a supply, while maintaining increased efficiency with decreased size.

A further object is to provide a simple means of driving an inverter with a pulse width modulated waveform.

Still another object of the present invention is to provide a power supply having all drive and associated circuits floating to enable series or parallel connections, while providing optimun drive to such circuits.

BRIEF DESCRIPTION OF PREFERRED EMBODIMENT

A switching power supply of the type including first and second transistors each having a collector, base and emitter electrode, with said collector to emitter paths coupled to the primary winding of an output transformer adapted to provide at a secondary winding, a repetitive signal which is rectified to provide a given DC output level, said repetitive signal developed when said transistors are caused to conduct alternatively, said transistors undesireably having relatively large interelectrode capacitances whereby both transistors may conduct at the same time thereby shorting out said output transformer, the improvement therewith of apparatus for assuring that said transistors conduct alternatively while providing regulation of said DC output; comprising of drive means coupled to said base electrodes of said transistors to drive each of said base electrodes at a given repetition rate and of an opposite polarity to cause said transistors to provide said repetitive waveform due to said alternate conductiion and means responsive to said drive means to bias said transistors off for a predetermined duration occuring at a time indicative of both transistors conducting due to said interelectrode capacitance, said means including means responsive to said DC output level to vary said predetermined duration according to the level of said DC output, whereby when said DC output is at said given value, said means provide said predetermined duration, and when said DC output level is at an undesired value, said means vary said predetermined duration to cause said repetitive waveform to always be indicative of said given DC level.

DETAILED DESCRIPTION OF DRAWINGS

Figures 1, 1A:
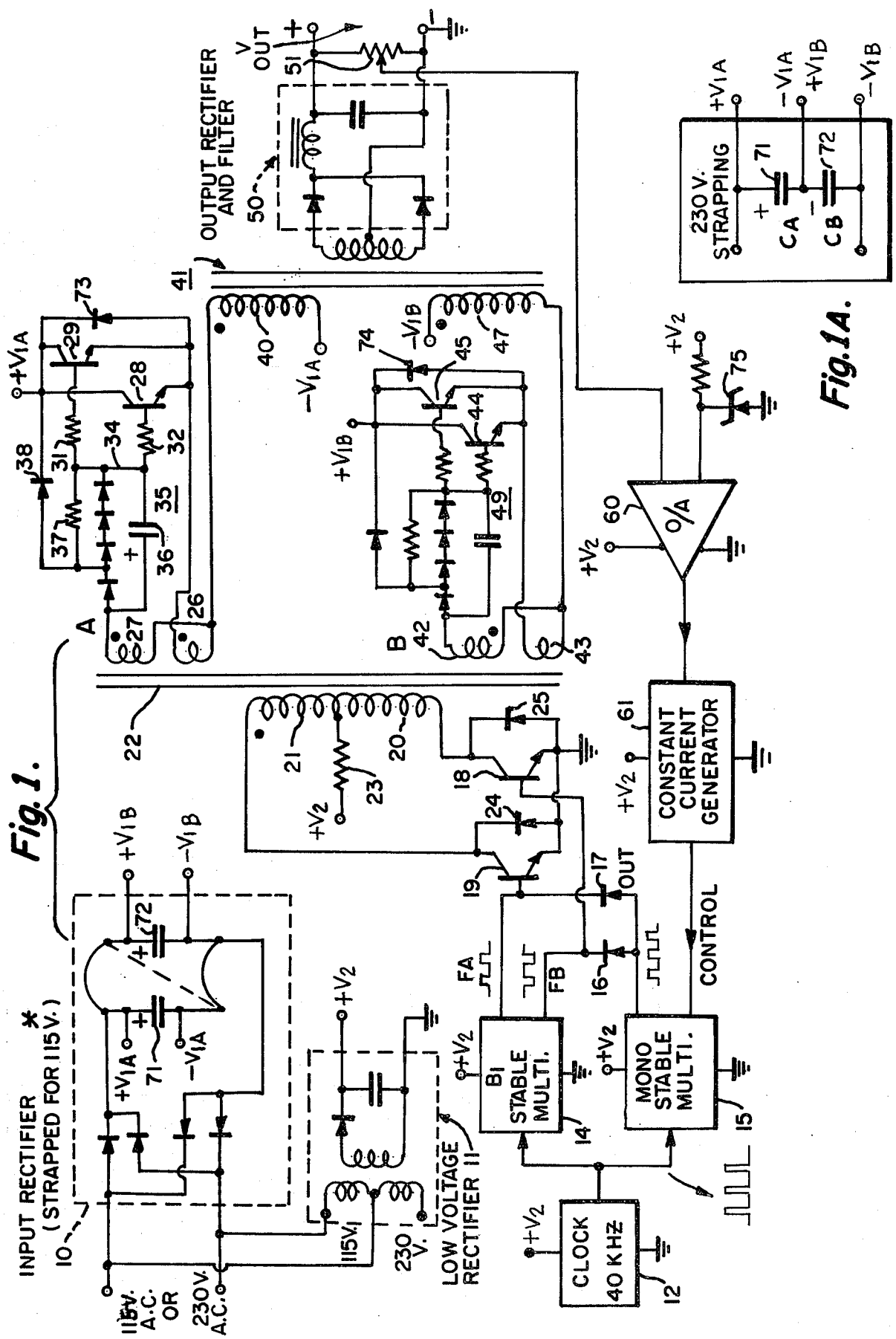
FIG. 1 is a schematic diagram partly in block form of a pulse width modulated power supply according to this invention.
FIG. 1A is a circuit diagram showing an alternate way of connecting two output capacitors shown in FIG. 1.

Referring to FIG. 1, there is shown a rectifier-filter module 10. The input rectifier is normally connected to the AC line via a suitable fuse and a transient suppressent filter which may consist of a series inductor and suitable capacitors. The rectifier is a full wave bridge type of conventional design. The rectifier output is connected to capacitors 71 and 72. As shown in module 10, the capacitors are connected in parallel. This connection is appropriate for 115 v. AC input. For 230 volt input, the capacitors are strapped in series as shown in FIG. 1A.

However, in either case the voltage that appears across each capacitor will be approximately 150 v. DC. These voltages are designated $\pm V1A$ across capacitor 71 and $\pm V1B$ across capacitor 72. These voltages supply the DC power to primary windings 40 and 47 of the main inverter transformer 41 through switching transistors 28, 29 and 44, 45.

Depending on the connections on module 10 (series or parallel), the primary circuits of inverter transformer 41 are connected either in series or parallel.

Also connected to the AC line is a module designated low voltage rectifier and filter 11. This module may consist of a small power transformer and a rectifier with a filter capacitor. The transformer 11 provides a means of isolating the output circuits from the input AC and by changing a primary tap on the transformer, operation is compatible with both 115 v. and 230 volt inputs.

The output voltage of this module is designated as $+V2$. It is used to provide DC to low power rated integrated circuits which are common to the DC output terminal or a point of reference potential.

Typical values for V2 would be 12 volts. This voltage may be regulated by means of a zener diode or some other conventional means.

Techniques for generating voltages as V2 are known in the art and are not considered to be part of this invention.

Shown coupled to the low voltage supply V2 is a clock or oscillator circuit 12. The clock circuit 12 may be a conventional oscillator configuration operating for example, at 40 KHz. The clock 40 may comprise any type of free running oscillator configuration, such as an astable multivibrator or any other type of oscillator configuration.

The astable multivibrator, which as is known in the art, employs capacitors and resistors to generate, for example, a 40 KHz waveform at its output.

There are a number of suitable oscillator configurations commercially available as integrated circuits, which are capable of providing the necessary waveforms and which can be directly operated from a low voltage source such as that provided by the low voltage supply 11.

Figure 2:
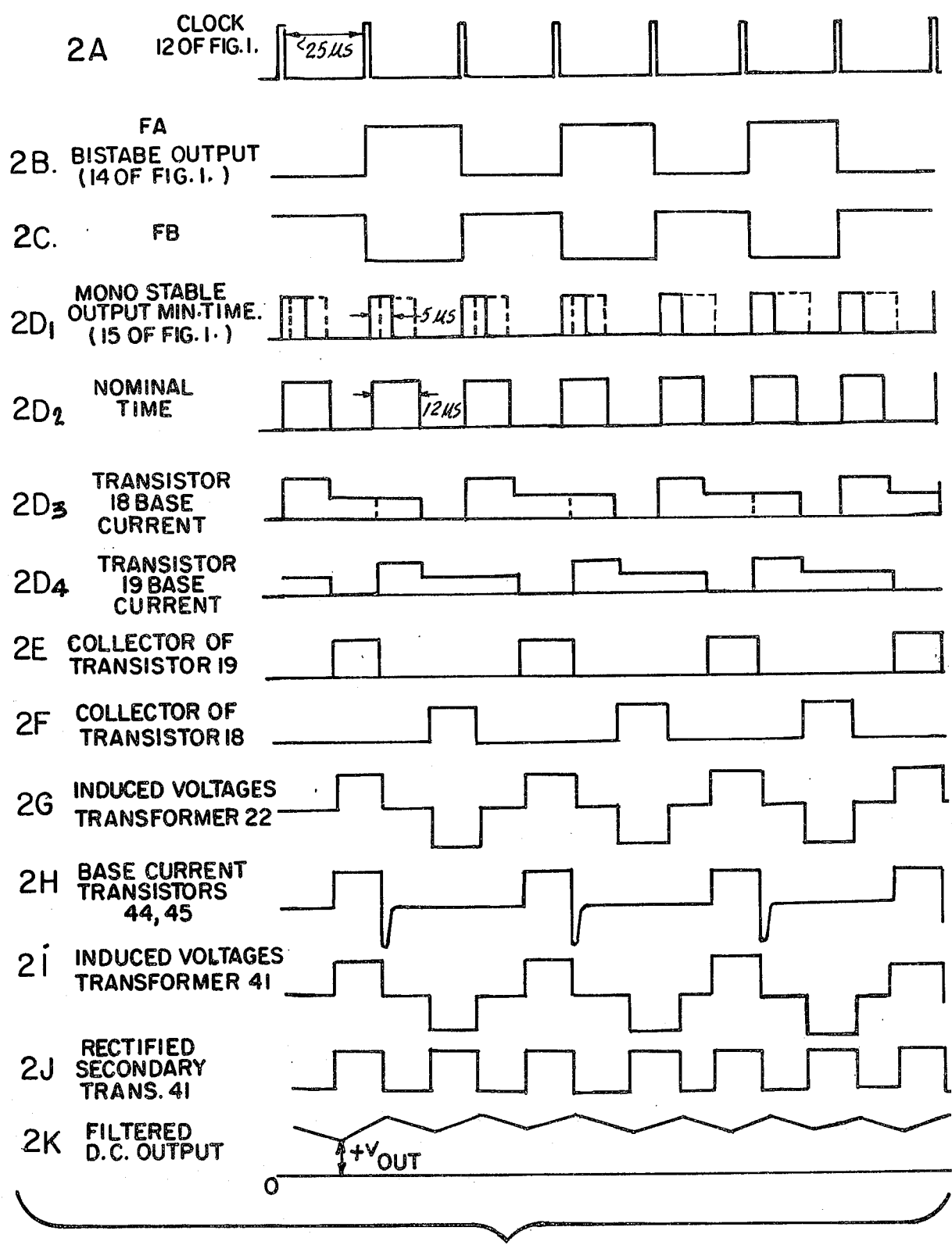
FIG. 2 is a series of waveform diagrams A through k depicting waveform at various points and terminals of FIG. 1 and useful to explain and clarify operation of the supply shown.

For the sake of clarity, typical waveforms associated with the circuitry to be described are shown in FIG. 2.

FIG. 2A shows the output of the clock, which as indicated, is at a 40 KHz rate. The output of the clock 12 is applied to the input of a bistable multivibrator 14 and monostable multivibrator 15.

The bistable 14 is also conventionally referred to as a flip/flop and has two stable states and can be triggered or set from one state to another by means of the application of a clock waveform to the input. Such circuits are very well known in the art and a number of different configurations can be employed.

Due to the nature of operation of the bistable, it serves to provide at its output, two waveforms, each 180° out of phase with each other and at a repetition rate which is equal to one-half the clock frequency, which in this instance is 20 KHz. For the sake of clarity, the waveforms have been designated as FA and FB and are shown as FIGS. 2B and 2C.

Essentially, the outputs of the bistable multivibrator 14 are as shown in FIGS. 2B and 2C, each waveform being of opposite polarity and one-half the input clock frequency.

As indicated, the monostable multivibrator 15 is also coupled and driven by the clock source 12. A monostable multivibrator sometimes referred to as a one-shot, only has one stable state as compared to a flip-flop. It can be triggered from the one stable state to a second state and remains in that second state for a timed duration determined by the time required to charge or discharge a capacitor. After this time duration, the circuit automatically reverts back to its stable state.

Examples of such multivibrators are well known and both the bistable 14 and monostable 15 are widely available as integrated circuit chips produced and provided by a plurality of manufacturers.

Due to the fact that the one-shot has a pulse duration determined by a time constant, one can obtain a varying pulse width by either varying the resistor or the time constant capacitor or by varying the current supplied to the capacitor.

There are virtually numerous techniques for performing pulse width modulation having a one-shot or a monostable multivibrator.

As will be explained subsequently, the one-shot 15 in this apparatus also has its pulse width varied by means of a conventional technique shown schematically by constant current circuit 61.

As will be explained, the one-shot functions in a dual manner.

First, it operates to assure that the output power transistors cannot conduct at the same time, thus eliminating the above described problem of switch through.

It further has its pulse width or duration varied according to the output voltage as monitored, to provide regulation of the power supply.

The output waveform of the monostable multi 15 is shown in FIG. 2D. Since the monostable triggers on positive clock transition, it also has a 40 KHz repetition rate. The duty cycle of the one-shot 15 is dependent upon the time constant of the circuit which as above indicated, is varied by current source 61 in one of many available techniques.

The output waveforms FA and FB are applied to the base inputs of two transistors 18 and 19. Thus, as shown, the FA output of bistable 14 is coupled to the base electrode of transistor 19, while the FB output of the bistable 14 is coupled to the base electrode of transistor 18. The emitter electrodes of transistors 18 and 19 are shown connected to a point of reference potential which may be ground.

Similarly, the output of monostable multi 15 drives the base electrodes of transistor 18 and 19. However, since this is a single output, isolating devices must be used to avoid paralleling the bases. In FIG. 1 diodes 16 and 17 are used to maintain this isolation.

The collector electrodes of transistors 18 and 19 are coupled to different end terminals of the primary windings 20 and 21 of center tapped transformer 22. The center tap of transformer 22 is connected to the low voltage supply 11 via a current limiting resistor 23.

Transistors 18 and 19 act together to "steer" the operation of the drive transformer 22. If both transistors are on, transformer 22 essentially is "short circuited" and unable to allow a voltage to be induced across its windings. When transistors 18 and 19 are both on or saturated, the voltage V2 supplied to the center tap of this "steering" winding then appears across current limit resistor 23 and the voltages at all transformer windings are zero. However, if only one transistor is on, the voltage V2 will cause a current to flow through resistor 23 and the appropriate transformer winding to common through the "on" transistor. This sets up a regenerative drive circuit which will be explained in detail later.

Diodes 24 and 25 are respectively coupled from the collector electrodes of transistor 18 and 19 to a point of reference potential and operate to protect the transistors from undue voltage spikes and provide a current path during switching operation.

Transformer 22 has four additional windings. These windings are connected to provide drive current for power transistors 28, 29, 44 and 45.

As indicated, transformer 41 is the power inverter transformer. It has two primary windings, 40 and 47.

Each primary winding of transformer 41 has its own independent drive circuit.

Primary winding 40 receives its DC power from capacitor 71. One section of winding 40 is connected to the negative side of capacitor 71 (−V1A). The positive side of capacitor 71 (+V1A) is connected to the collector electrodes of transistors 28 and 29. The emitter electrodes of transistors 28 and 29 are connected together. They then are connected to the other section of winding 40 through winding 26 of transformer 22.

Winding 26 as will be shown presents a very low voltage drop to the series circuit (>2 volts) allowing essentially all of V1A to appear across winding 40 when drive transistors 28 and 29 are conducting.

Winding 27 of transformer 22 is connected to the junction of winding 26 and winding 40 (it is possible to connect it to the emitter of 28 and 29, however this connection can cause instabilities in some instances and the degeneration provided by the connection shown is preferable). This winding provides base drive for transistors 28 and 29.

Transistors 28 and 29 are essentially connected in parallel to provide higher currents than either transistor could deliver individually. Resistors 31 and 32 serve to assist in equalizing base currents and therefore collector current. Any number of transistors may be used by similarly connecting their bases through small "sharing" or series resistors as 31 and 32.

During operation, transistors 28 and 29 must be driven negative when winding 27 has zero voltage across it. A small battery in series with winding 27 would provide this bias however, it would be impractical.

A string of four diodes in series across which a capacitor 36 has been placed is used to provide this bias.

When positive drive is provided to the bases of 28 and 29 through winding 27, the diodes act as a clamp permitting capacitor 36 to charge to a maximum DC voltage equal to four diode drops (≈2.8 volts). When the voltage across winding 27 returns to zero, capacitor 36 causes a negative bias to appear at the bases of transistors 28 and 29. This bias is used to discharge the stored base charge on the transistors, which is necessary to reduce storage times when switching. The number of diodes and size of capacitor 36 is determined by the characteristics and number of switching transistors used.

Resistor 37 reduces the necessary bias required when the circuit is first activated and until the diodes are forward biased.

Diode 38 helps to reduce base drive if the switching transistors are saturated. It may be placed at any point on the string of diodes to optimize the switching efficiency.

Diode 73 clamps any switching spikes due to leakage inductance in winding 40 returning the energy to capacitor 71.

The biasing arrangement for transistors 44 and 45 is similar to that described for transistors 28 and 29 and includes a diode string circuit 49 and associated circuit components as indicated above.

While the parallel transistor circuits appear substantially similar, it is noted that due to the secondary winding polarity (referenced by the dots in the drawing) that the circuits conduct alternately as will be explained.

Thus, the parallel transistors 28 and 29 do not conduct at the same time as transistors 44 and 45. They conduct current alternately to enable the alternate driving of primary winding 40 and 47 of the output transformer 41.

The output voltage V out is developed by coupling the secondary winding of transformer 41 as driven by the primary windings 40 and 47 to an output rectifier and filter circuit 50. The rectifier 50 operates to convert the waveforms developed across the primary winding 40 and 47 which as combined at the secondary of the transformer 41, can be rectified in a conventional manner to produce the output voltage V out.

A resistor 51 may be connected across the output in order to provide a sample of the output voltage at a predetermined level.

Accordingly, a sample of the output of the power supply, as that voltage through a component as resistor 51, is coupled to one input of an operational amplifier comparator as 60. The other input is referenced by a Zener diode 75 or other reference potential device.

The comparator 60 will provide an output when the feedback signal, as from resistor 51, is above or below the reference level. Such circuits known as comparators may employ well known differential amplifier configurations which function as described. Such circuits to compare a sampled voltage or a feedback voltage to a reference signal are well known in the art and have been used in all types of power supplies.

The output of the comparator 60 may be applied to the input of a constant current generator 61, whose output may vary the charging current to the timing capacitor of 16 and thereby vary the pulse width of the monostable 16; as above indicated.

The dashed lines in FIG. 2D show the variation of the pulse width of the monostable 15. In actual practice with a switching rate determined by the flip/flop 14 or 20 KHz, the one-shot pulse width is made to vary between 5 to 25 microseconds.

It being understood that this is merely representative and other time variations depending on the transistors used and so on, can be implemented as well.

THEORY OF OPERATION

When power is applied voltages V1A, V1B and V2 rise to their nominal values. The clock 12 initiates a pulse which causes the bistable 14 and the monostable 15 to change states. As the output V out is low, relative to reference diode 75, operation amplifier 60 will cause constant current generator 61 to deliver maximum current to the pulse determining capacitor in monostable 15. Circuit parameters are selected to limit the minimum pulse time to slightly longer than the switching transistors storage time (typically 5 $\mu$ sec.). For this period of time the mono output is high and transistors 18 and 19 are both on. This puts an effective short on the primary of transformer 22. When the output of the monostable 15 is off, transistors 18 and 19 then assume the states dictated solely by the bistable 14. Assuming FA is low and FB is high, transistor 19 will be off and transistor 18 will be on. Current will now flow from V2 through resistor 23 and one-half the primary of transformer 22 and transistor 18. This induces a voltage in the windings of transformer 22 with the dotted leads positive. The voltage induced in winding 27 causes base current to flow in transistors 28 and 29. This current of course also flows through the string of diodes 34 and capacitor 36. Resistor 37 provides an alternate path for this flow if the induced voltage is insufficient to overcome the diode drops. Transistors 28 and 29 begin conducting causing current to flow from their emitters through winding 26 of transformer 22 and winding 40 of transformer 41. The current flowing in winding 26 adds to the already induced field of transformer 22 increasing the voltage at windings 20 and 27 (actually all windings). This causes a regenerative situation by increasing drive to transistors 28 and 29, which increases their emitter current which increases the current in winding 26, which increases the voltage induced in winding 27 increasing drive, etc. This regenerative state continues until transistors 28 and 29 have reached saturation. At this point, the circuit stabilizes in the following way. First, winding 26 is now responsible for the induced voltages as it induces a voltage greater than V2 in windings 20 and 21. Winding 27 determines what the induced voltage is, as it reflects a very low impedance (once the diode drops and base emitter drops (28 and 29) are overcome). This causes the transformer 22 to operate as a current transformer; where the currents in windings 26 and 27 are an inverse ratio of the turns of the two windings. This ratio is set such as to be equal to the required $1b$ (base) to $1c$ (collector) ratio of transistors 28 and 29 at saturation.

Typically, winding 26 will have from one-third to one-tenth the turns of 27. Assuming a one to five ratio, the induced voltages would be approximately 5V for winding 27 and 1 volt for winding 26. During this time, capacitor 36 charges to a voltage limited by the four diode drops ($\approx 2.8$V). This stable state is maintained until the next clock pulse.

When the next clock pulse appears both multis (14 and 15) change state. Mono 15 turns on transistors 18 and 19. Current begins to flow through transistor 19 and diode 25. As transistor 19 is driven into saturation reducing the voltage across windings 20 and 21, it causes the induced voltage on winding 27 to collapse. This starts to turn off transistors 28 and 29. As they turn off, winding 26 no longer can induce drive current in 27 and the entire circuit degenerates until there is no voltage induced in windings 26 and 27. As this occurs, the drop to zero volts at winding 27 places the negative side of capacitor 36 at approximately −2.8 volts relative to the emitters of transistors 28 and 29. This causes the stored charge at the base electrode of transistors 28 and 29 to flow in capacitor 36 through resistors 31 and 32, hastening turn off of transistors 28 and 29.

A stable state is reached where transistors 28 and 29 are off, there is no induced voltage in windings 26 and 27 and a small DC current flows through resistor 23 and divides equally through windings 20 and 21 and transistors 18 and 19. This state will remain until the monostable multi 15 resets. At that point, the multi 15 turns off leaving only the drive current from the bistable 14. However, since the last clock pulse caused the bistable to change states, FA is now high and transistor 19 remains on. The induced voltage in winding 21 causes winding 42 to initiate a conduction cycle of transistors 44 and 45. This cycle is identical to the one previously described with the exception that it takes place in driver section B and induces its voltage in winding 47. Winding 47 however, is connected in opposite phase to winding 40 and therefore induces a field equal and opposite to that caused by winding 40. This maintains AC on the transformer.

As the cycle described is repeated at one-half the clock rate (20 KHz), the voltage V1A and V1B alternately are placed across windings 40 and 47. This induces a voltage in the secondary of transformer 41. This voltage is rectified and filtered with a filter 50, which produces a DC voltage equal to the average DC of the rectified output. When this DC voltage reaches its desired level as determined by resistor divider 51 and reference voltage 75, operational amplifier 60 causes constant current generator 61 to modify the monostable time as required to maintain this voltage. This time is varied between 5 to 25 $\mu$ seconds. At 5 $\mu$ sec., the invertor will operate at its maximum duty cycle. The reason for a minimum time is to prevent "switch through" which is caused if both transistors are on simultaneously. Due to the fact that the storage times of the devices used are well under 5 $\mu$ seconds, "switch through" cannot occur (even if both transistors were somehow turned on, the circuit cannot by design drive both on simultaneously). When the mono is operating at its maximum of 25 $\mu$ sec., it will not permit inverter turn on and output is zero.

Circuit parameters are designed to achieve one-half load nominal output voltage at a 50 percent duty cycle (12 $\mu$ sec.) allowing the control mono to have a wide latitude of control to correct for input line and output load changes.

As one can ascertain, the above described power supply has the following advantages:

1. It provides a simple, inexpensive means of producing a pulse width modulated inverter waveform.
2. It provides an optimum drive current to the inverter transistor regardless of load.
3. A minimum dead time (which may be optimized for the parameters of the switching devices used) prevents switch through.
4. The inverter primary circuits may be isolated both from each other and the secondary drive circuit.

Typical operating waveforms are shown in FIG. 2 at various points throughout the supply of FIG. 1 to enable one to gain a still clearer understanding of the principles and capabilities of the above described apparatus.

I claim:

1. A switching power supply of the type providing a DC output signal indicative of the average value of a repetitive waveform produced by said switching power supply, comprising:
   a. a first and second transistor, each having a base, collector and emitter electrode,
   b. a source of biasing potential having at least two output terminals of opposite polarity coupled between said base to collector electrodes of said first and second transistors for biasing the same,
   c. driving means coupled between said base electrodes of said first and second transistors for causing one to conduct while the other is non-conducting and vice versa, to provide a first waveform of a given repetition rate and polarity at said first collector electrode, and a second waveform of the same rate and opposite polarity at said second collector electrode, said driving means including a source of a relatively stable frequency, means coupled to said source for providing first and second output signals of opposite phase and of a frequency relatively equal to one-half of said stable frequency, said first output signal applied to said base electrode of said first transistor and said second output signal applied to said base electrode of said second transistor,
   d. switch through means including an adjustable triggerable pulse source having an input terminal coupled to said stable frequency source and an output terminal for providing a pulse train at a frequency relatively equal to said stable frequency, said output terminal coupled to said base electrodes of said first and second transistors to cause both to conduct in the same mode during the presence of said pulse, and
   e. means coupled to said triggerable pulse and responsive to said average value of said DC output signal for varying the width of said pulse relatively independent of said stable frequency.

2. The power supply according to claim 1 wherein said driving means includes a bistable multivibrator.

3. The power supply according to claim 1 wherein said switch through means includes a monostable multivibrator having an output terminal coupled to said base electrodes of said first and second transistors.

4. The power supply according to claim 3 further including means coupled to said monostable multivibrator for varying the width of an output signal according to said DC output signal.

5. The power supply according to claim 1 wherein said source of biasing potential includes first and second output capacitors for storing thereacross two voltages of a given polarity and means for placing said capacitors in parallel in a first mode of operation and in series for a second mode of operation.

6. In a power supply apparatus of the type including a biasing source having two output terminals of opposite polarity, a pair of alternately conducting switching transistors, each including base, collector and emitter electrodes, said emitter to collector paths of said switching transistors being coupled between said output terminals of said biasing source to energize said transistors, to cause them to provide a repetitive waveform at an output thereof and rectifying means responsive to said repetitive waveform to provide a DC output indicative of the average value of said repetitive waveform; in combination therewith of apparatus for regulating said DC output while assuring that said switching transistors conduct alternately; comprising:
   a. a source of a relatively stable frequency,
   b. first means coupled to said source to provide first and second output signals of opposite phase and of a frequency relatively equal to one-half of said stable frequency, said first means having a first and a second output terminal with said first output terminal coupled to the base electrode of one of said switching transistors and said second output coupled to the base electrode of said other switching transistor to drive the same, at a frequency of said one-half of said stable frequency.

c. a triggerable pulse source coupled to said stable source and operative to provide a train of pulse when triggered by said source at said relatively stable frequency, said pulse source having a control input for varying the width of any of said pulses relatively independent of the frequency of said pulses, d. unilateral current conducting means coupled to the base electrodes of said switching transistors and said triggerable source to bias both said switching transistors on during said pulse independent of said opposite phase signals, and e. detecting means coupled to said triggerable source and responsive to the average value of said DC output for varying the pulse width of said pulses between a maximum and minimum level accoding to the value of said DC output.

7. The power supply apparatus according to claim 6 wherein said triggerable pulse source is a monostable multivibrator having a trigger input coupled to said relatively stable frequency source.

8. The power supply apparatus accoding to claim 6 wherein said emitter to collector paths of said switching transistors include a series connected transformer primary winding to develop thereacross, an output signal according to the conduction times of both of said switching transistors.

* * * * *